United States Patent
Olgaard et al.

(10) Patent No.: US 9,794,009 B1
(45) Date of Patent: Oct. 17, 2017

(54) METHOD FOR TESTING A RADIO FREQUENCY (RF) DATA PACKET SIGNAL TRANSCEIVER FOR PROPER IMPLICIT BEAMFORMING OPERATION

(71) Applicant: LITEPOINT CORPORATION, Sunnyvale, CA (US)

(72) Inventors: Christian Volf Olgaard, Saratoga, CA (US); Roman Schilter, Sunnyvale, CA (US); Minh-Chau Huynh, San Mateo, CA (US); Carsten Andersen, Vaerloese (DK)

(73) Assignee: LitePoint Corporation, Sunnyvale, CA (US)

( * ) Notice: Subject to any disclaimer, the term of this patent is extended or adjusted under 35 U.S.C. 154(b) by 0 days.

(21) Appl. No.: 15/197,966

(22) Filed: Jun. 30, 2016

(51) Int. Cl.
*H04B 17/29* (2015.01)
*H04B 17/15* (2015.01)
*H04B 7/06* (2006.01)

(52) U.S. Cl.
CPC ........ *H04B 17/29* (2015.01); *H04B 7/0617* (2013.01); *H04B 7/0682* (2013.01); *H04B 17/15* (2015.01)

(58) Field of Classification Search
CPC H04B 17/0037; H04B 17/15; H04B 17/3912; H04B 7/0689
See application file for complete search history.

(56) References Cited

U.S. PATENT DOCUMENTS

| | | |
|---|---|---|
| 8,811,461 B1 | 8/2014 | Huynh |
| 8,917,761 B2 | 12/2014 | Huynh |
| 2013/0301694 A1 | 11/2013 | Olgaard |
| 2014/0266929 A1 | 9/2014 | Huynh et al. |
| 2014/0266930 A1* | 9/2014 | Huynh ............ G01R 29/10 343/703 |
| 2014/0273873 A1 | 9/2014 | Huynh |
| 2014/0307568 A1* | 10/2014 | Zhang ............ H04B 7/0689 370/252 |
| 2015/0015299 A1 | 1/2015 | Johnson |
| 2015/0092824 A1 | 4/2015 | Wicker, Jr. et al. |
| 2016/0050569 A1 | 2/2016 | Olgaard et al. |

OTHER PUBLICATIONS

Aug. 24, 2017—(WO) International Search Report and Written Opinion—App PCT/2017/031305.

* cited by examiner

*Primary Examiner* — Janice Tieu
(74) *Attorney, Agent, or Firm* — Banner & Witcoff, Ltd.

(57) ABSTRACT

Method for testing implicit beamforming operation of a radio frequency (RF) data packet signal transceiver device under test (DUT), including transmitting to the DUT combinations of a multidirectional (e.g., legacy) RF test signal and at least two unidirectional (e.g., beamformed) RF test signals with different signal directivity patterns, and monitoring signal strengths of signals received from the DUT in response to each signal. Signal directivity patterns can be controlled by transmitting multiple phase-controlled RF signals via separate arrays of multiple antenna elements to the DUT within a multipath RF signal environment, such as an electromagnetically shielded enclosure.

12 Claims, 4 Drawing Sheets

METHOD FOR TESTING A RADIO FREQUENCY (RF) DATA PACKET SIGNAL TRANSCEIVER FOR PROPER IMPLICIT BEAMFORMING OPERATION

BACKGROUND

The present invention relates to testing of a radio frequency (RF) data packet signal transceiver, and in particular, to testing such a device for proper implicit beamforming operation.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

For testing these devices following their manufacture and assembly, current wireless device test systems typically employ testing subsystems for providing test signals to each device under test (DUT) and analyzing signals received from each DUT. Some subsystems (often referred to as "testers") include one or more vector signal generators (VSG) for providing the source, or test, signals to be transmitted to the DUT, and one or more vector signal analyzers (VSA) for analyzing signals produced by the DUT. The production of test signals by a VSG and signal analysis performed by a VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

Testing of wireless devices typically involves testing of their receiving and transmitting subsystems. The tester will typically send a prescribed sequence of test data packet signals to a DUT, e.g., using different frequencies, power levels, and/or modulation technologies, to determine if the DUT receiving subsystem is operating properly. Similarly, the DUT will send test data packet signals at a variety of frequencies, power levels, and/or modulation technologies to determine if the DUT transmitting subsystem is operating properly.

Current Wi-Fi devices that comply with the IEEE 802.11n standard, as well as some other wireless standards, can employ beamforming as a way to improve range and performance by focusing more signal energy from the device to an access point. When manufacturing such devices, the beamforming capability is tested. One technique includes use of conductive signal paths (e.g., cables to convey the RF signals between the device RF ports and the tester RF ports) to simulate a channel condition that would cause a properly operating device to respond by altering its outputs to beamform the signals being emitted from its RF ports. This response can be detected and measured by the tester signal analysis subsystem(s). However, testing a device using conductive signal paths prevents inclusion of its antenna subsystems as part of the test(s). Thus, such conductive beamforming testing will verify correct operation of a partially assembled device, but will not verify that the fully assembled device (i.e., with its antennas) continues to operate properly.

In order to test a fully assembled device using real-world conditions, one would actually transmit a radiated signal between the antennas of the device and the antenna(s) of a test system. However, doing so within a shielded enclosure to provide isolation from other signals, would place the device in a multipath-rich environment.

Accordingly, it would be desirable to provide a system and method for controlling multipath effects in such a manner that would permit wholly assembled devices, including their antennas, to be tested for beamforming performance in multipath-rich environments with significantly higher degrees of repeatability and accuracy.

SUMMARY

In accordance with the presently claimed invention, a method for testing implicit beamforming operation of a radio frequency (RF) data packet signal transceiver device under test (DUT), including transmitting to the DUT combinations of a multidirectional (e.g., legacy) RF test signal and at least two unidirectional (e.g., beamformed) RF test signals with different signal directivity patterns, and monitoring signal strengths of signals received from the DUT in response to each signal. Signal directivity patterns can be controlled by transmitting multiple phase-controlled RF signals via separate arrays of multiple antenna elements to the DUT within a multipath RF signal environment, such as an electromagnetically shielded enclosure.

In accordance with one embodiment of the presently claimed invention, a method for testing implicit beamforming operation of a radio frequency (RF) data packet signal transceiver device under test (DUT) includes:

transmitting, within a multipath RF signal environment via a plurality of antennas, a plurality of phase-controlled RF signals for reception by a DUT disposed at a DUT position within the multipath RF signal environment, including transmitting one or more of the plurality of phase-controlled RF signals as a multidirectional RF test signal, transmitting, via a first portion of the plurality of antennas, a first portion of the plurality of phase-controlled RF signals as a first substantially unidirectional RF test signal with a longitudinal signal axis in a first forward direction substantially toward the DUT position, and transmitting, via a second portion of the plurality of antennas, a second portion of the plurality of phase-controlled RF signals as a second substantially unidirectional RF test signal with a longitudinal signal axis in a second forward direction substantially toward the DUT position; and receiving, via the multipath RF signal environment and the plurality of antennas, a plurality of RF data packet signals transmitted by the DUT, including receiving a multidirectional RF DUT signal, receiving, via the first and second portions of the plurality of antennas, a first portion of the plurality of RF data packet signals as a first substantially unidirectional RF DUT signal with a longitudinal signal axis in a first reverse direction substantially toward the first portion of the plurality of antennas, and receiving, via the first and second portions of the plurality of antennas, a second portion of the plurality of RF data packet signals as a second substantially unidirectional RF DUT signal with a longitudinal signal axis in a second reverse direction substantially toward the second portion of the plurality of antennas.

In accordance with another embodiment of the presently claimed invention, a method for testing implicit beamforming operation of a radio frequency (RF) data packet signal transceiver device under test (DUT) includes:

receiving, with a DUT disposed at a DUT position within a multipath RF signal environment from a plurality of antennas, a plurality of phase-controlled RF signals, including receiving one or more of the plurality of phase-controlled RF signals as a multidirectional RF test signal, receiving a first portion of the plurality of phase-controlled RF signals as a first substantially unidirectional RF test signal with a longitudinal signal axis in a first forward direction from a first portion of the plurality of antennas substantially toward the DUT position, and receiving a second portion of the plurality of phase-controlled RF signals as a second substantially unidirectional RF test signal with a longitudinal signal axis in a second forward direction from a second portion of the plurality of antennas substantially toward the DUT position; and transmitting, with the DUT via the multipath RF signal environment, a plurality of RF data packet signals, including transmitting a multidirectional RF DUT signal, transmitting a first portion of the plurality of RF data packet signals as a first substantially unidirectional RF DUT signal with a longitudinal signal axis in a first reverse direction substantially toward the first portion of the plurality of antennas, and transmitting a second portion of the plurality of RF data packet signals as a second substantially unidirectional RF DUT signal with a longitudinal signal axis in a second reverse direction substantially toward the second portion of the plurality of antennas.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies (e.g., IEEE 802.11a/b/g/n/ac, 3GPP LTE, and Bluetooth). The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested (TX tests) by having them send packets to the test system, which then evaluates the physical characteristics of the signals sent by the DUT.

As discussed in more detail below, in accordance with exemplary embodiments of the presently claimed invention, methods are provided for testing a wireless device (DUT) by using radiated signals in a multipath-rich environment. Implicit beamforming is used in conducting TX tests, e.g., with multiple antenna arrays inside a shielded enclosure to reduce multipath effects by emitting individual phase-controlled signals for reception by the DUT and receiving beamformed signals from the DUT. As a result, beamforming performance of the DUT can be compared to its signals prior to beamforming to confirm an expected increase in signal strength in the desired, or beamformed, direction and a decrease in signal strength in an undesired, or non-beamformed, direction, relative to a legacy signal where no beamforming has been done. Final verification can then be done by having the DUT receive a signal from a formerly undesired direction and in response thereto perform beamforming for that direction. When the DUT transmits the new beamformed signal, such response signal will now show an increase in signal strength compared to the legacy signal.

As noted, wireless device technology has advanced to include beamforming as a way to improve the signal to noise level of signals conveyed from a device to an access point, such as a base station. A device receiving a signal from an access point can determine some aspects of the signal path, or "channel", that exists between it and the access point, and can make some changes to the signals emitted by its multiple transmitters and antennas so as to increase the signal strength in a desired direction (e.g, more directly toward the access point). Also, a beamformed signal favoring one direction will generally result in diminished signal strength in other directions. Thus, a properly operating device capable of employing beamforming will produce a signal of increased signal strength in the favored, or beamforming, direction while also producing decreased signal strength in other directions as compared to the signal strength of a signal of the same transmitter power prior with no beamforming applied.

Figure 1:
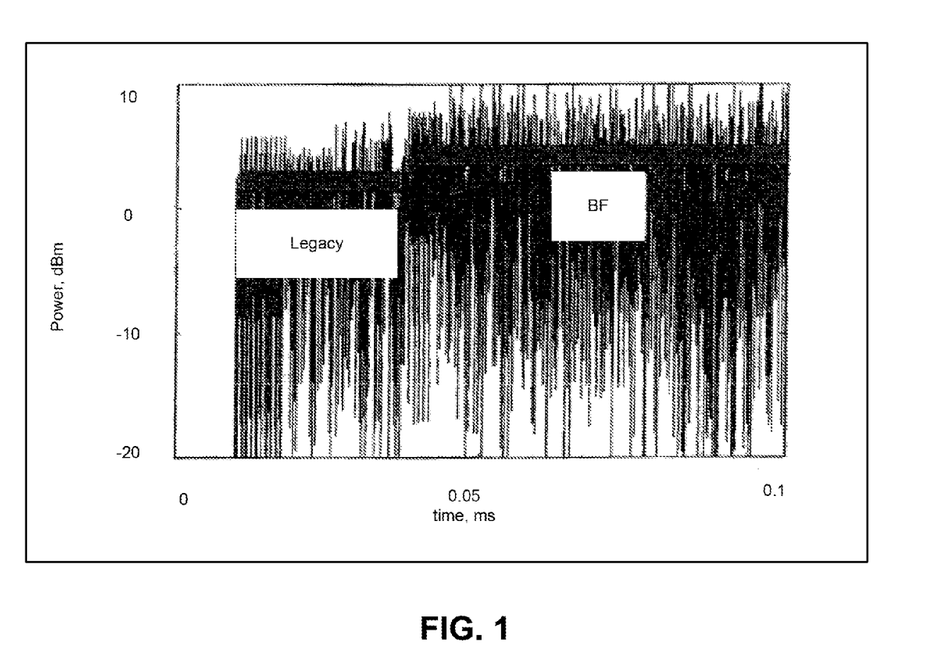
FIG. 1 depicts relative strengths of received legacy (e.g., non-beamformed) and beamformed (BF) WiFi signals.

Referring to FIG. 1, if signal strength is measured prior to applying beamforming (e.g., a legacy signal which typically has omnidirectional signal strength), and then measured from along a desired direction with beamforming applied, the measured signal strength will be increased. As depicted here, a DUT may transmit a signal during a portion of which is non-beamformed (e.g., legacy) followed by another portion of which is beamformed.

Figure 2:
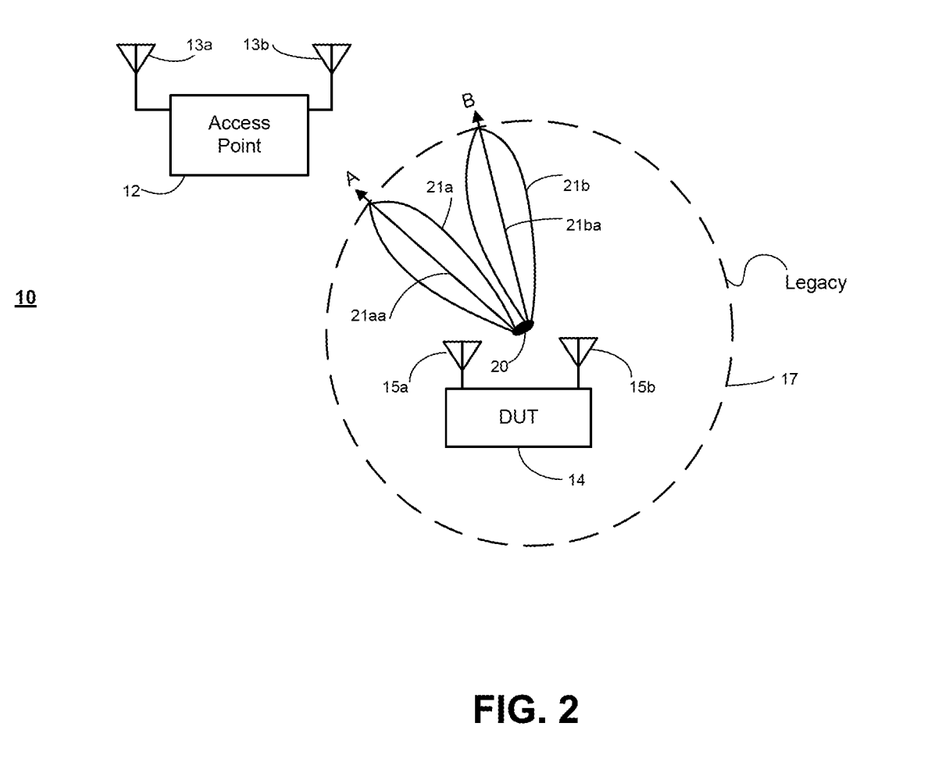
FIG. 2 depicts a WiFi signal environment with an access point and a wireless device positioned such that TX signals from the device propagating in Directions A and B result in higher and lower signal strengths, respectively, as received by the access point.

Referring to FIG. 2, a method for testing implicit beamforming operation of a wireless device takes advantage of a portion of the IEEE 802.11n standard that defines two types of implementation of transmit signal beamforming, implicit and explicit, and more particularly, implicit beamforming. As is well known, this standard defines a process of "sounding" of the signal path, or channel, by which channel state information (CSI) can be determined. A sounding packet can also be used for this purpose. Implicit feedback transmit beamforming is based on the channel between the transmitter and receiver being reciprocal, i.e., having substantially identical signal propagation characteristics in both uplink and downlink directions. (Further discussion of implicit beamforming can be found in U.S. patent application Ser. No. 14/461,573, the disclosure of which is incorporated herein by reference.) In accordance with the presently claimed invention, however, such reciprocity is not critical since testing is more concerned about qualitative, rather than quantitative, levels of signal strength. The source of the transmit signal transmits a training request signal (TRQ), which is a standard packet in accordance with the IEEE 802.11 standard, and listens for a sounding packet in response. Upon receiving the sounding packet, the source estimates the CSI for the receive signal path, or channel, and computes a steering matrix (e.g., values for weighting phases of signals emitted by the multiple antennas of the device) for use in steering subsequent signal transmissions to the destination device in the transmit direction.

In a typical operating environment 10, an access point (AP) 12 and DUT 14 are MIMO (multiple input, multiple output) devices having multiple antennas 13 (e.g., at least two antennas 13a, 13b), 15 (e.g., at least two antennas 15a, 15b) communicating with each other via data packet signals in accordance with well-known principals and techniques. In the absence of beamforming by the DUT 14, its radiated signal, e.g., a legacy signal, will have an omnidirectional radiation pattern 17 providing substantially equal signal strengths to all locations extending radially outward from the effective center 20 of its signal transmissions. With application of beamforming, however, signal strength will be concentrated with significantly more directivity. For example, with beamforming applied along direction A, signal energy transmitted by the DUT 14 will produce an effective radiation pattern 21a having a longitudinal axis 21aa as shown. Similarly, with beamforming applied along another direction B, signal energy transmitted by the DUT 14 will produce an effective radiation pattern 21b with a longitudinal axis 21ba with directivity along direction B.

As will be readily understood by one of ordinary skill in the art, these effective radiation patterns 21a, 21b (which are effectively substantially unidirectional with their "directions" defined by their longitudinal axes) are the result of constructive signal interference occurring within the region of reception of multiple signals within the signal environment. For example, by transmitting similar RF signals from its multiple antennas 15a, 15b, with appropriate control of the mutual phase differences between the transmitted RF signals, resulting mutual interference between the signals upon their arrivals at each antenna 13a, 13b of the AP 12 will be either constructive or destructive, thereby making the effective received signal strength (e.g., received signal power) being greater than or less than, respectively, received signal strength in the absence of transmitted signal phase controls. (This example involves the use of two antennas at the DUT 14 and AP 12, but larger numbers of antennas can be used, as well as different numbers of antennas at the DUT 14 and AP 12, in accordance with the principles as described here.)

Accordingly, with placement of the AP 12 and DUT 14 as shown, when the DUT 14 is transmitting with beamforming applied along direction A, signal strength of the signal received by the AP 12 will be stronger than that received during reception of an omnidirectional legacy signal. Conversely, with beamforming applied along direction B, signal strength of signals received by the access point will be less than that during reception of an omnidirectional legacy signal.

Figure 3A:
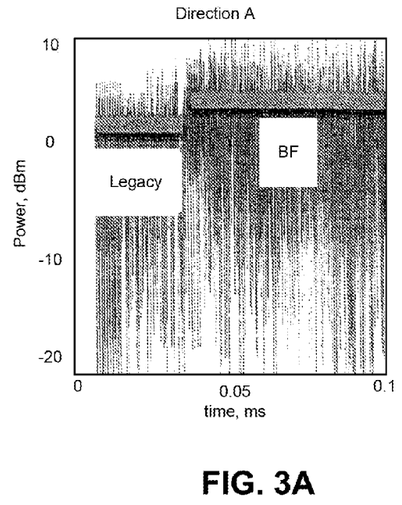
FIGS. 3A-3B depict relative strengths of legacy and beamformed TX signals from the device as received by the access point (mutually positioned as shown in FIG. 2) when the beamforming favors Directions A and B.
Figure 3B:
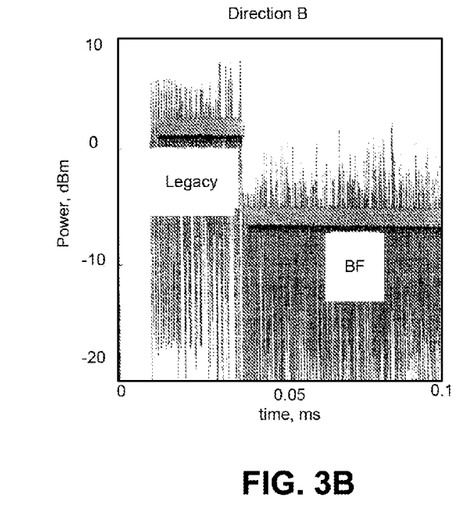

Referring to FIGS. 3A-3B, these differences in received signal strengths can be represented as shown. For example, referring to FIG. 3A, as discussed above, with beamforming applied along direction A, strength of the signal received by the access point 12 is greater than that received during reception of an omnidirectional legacy signal. Referring to FIG. 3B, when beamforming is applied along direction B, e.g., in a direction substantially different from direction A toward the access point 12, strength of signals received by the access point 12 will be lower than those of an omnidirectional legacy signal.

Figure 4:
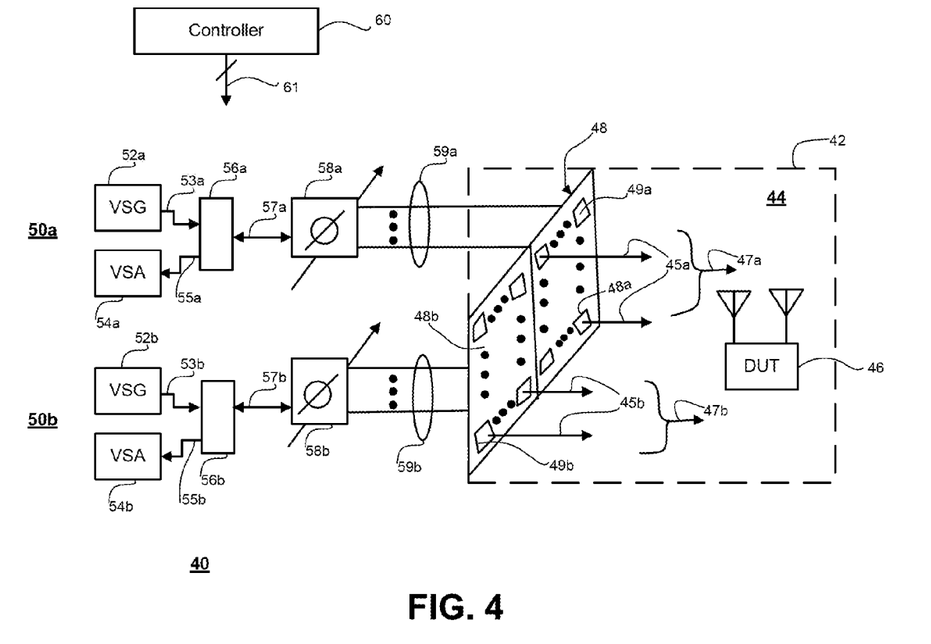
FIG. 4 depicts an exemplary testing environment for testing implicit beamforming operation in accordance with the presently claimed invention.

Referring to FIG. 4, a testing environment 40 for testing in accordance with the presently claimed invention includes a shielded enclosure 42 defining an interior region 44 containing a DUT 46 and an antenna array 48. The structure of the shielded enclosure 42 defines the interior region 44 and an exterior region, and is configured in accordance with well-known principals and techniques to substantially isolate the interior region 44 from electromagnetic radiation originating from the exterior region.

The antenna array 48 includes at least two sub-arrays 48a, 48b, each of which includes multiple antenna elements 49a, 49b, each of which will be provided a respective phase-controlled RF signal (discussed in more detail below) to produce respective sets 47a, 47b of radiated signals each of which includes multiple radiated signals 45a, 45b of which at least some have mutually distinct signal phases to offset or otherwise compensate for multipath effects caused by reflective signal characteristics of the interior 44 of the shielded enclosure 42.

Test equipment outside of the shielded enclosure 42 can include one or more testers 50a, 50b and a controller 60. One of the testers 50a (or a portion of a single tester 50) includes a signal source (e.g., VSG) 52a, a signal analysis subsystem (e.g., VSA) 54a, signal routing circuitry 56a, and signal replication and phase-control circuitry 58a. The other tester 50b (or other portion of a single tester 50) similarly includes a signal source 52b, a signal analysis subsystem 54b, signal routing circuitry 56b, and signal replication and phase-control circuitry 58b.

The signal routing circuitry 56a, 56b (e.g., implemented as RF signal coupling/splitting circuitry or switching circuitry) controls routing of the source signals 53a, 53b to the signal replication and phase-control circuitry 58a, 58b via shared signal paths 57a, 57b. The routing circuitry 56a, 56b also receives incoming RF signals via the shared signal paths 57a, 57b and conveys these incoming signals 55a, 55b to the signal analysis subsystems 54a, 54b. The signal replication and phase-control circuitry 58a, 58b replicates the source signals 53a, 53b into multiple replica signals, each of which has a respective signal phase that is controlled so as to provide sets 59a, 59b of multiple, individually phase-controlled RF signals to respective ones of the antenna sub-arrays 48a, 48b. Each of the tester subsystems 52, 54, 56, 58 is controlled by one or more respective control signals from a set 61 of control signals provided from the controller 60. (Further discussions of testing wireless devices in shielded enclosures can be found in U.S. Pat. Nos. 8,811,461 and 8,917,761, and U.S. patent application Ser. Nos. 13/839,162, 13/839,583 and 13/912,423, the disclosures of which are incorporated herein by reference.)

During operation, the first signal source 52a would provide a common source signal 53a which is replicated to produce multiple replicated source signals 59a, each of which is individually phase-controlled and transmitted by a respective one of the antenna elements 49a of the first antenna sub-array 48a. Through appropriate selection of the phase adjustments of the signals feeding the antenna elements 49a, multipath effects and destructive interference within the shielded enclosure 42 can be compensated in such a manner as to produce a set 47a of signals for transmission to the DUT 46 (e.g., in desired A and undesired B directions such as depicted in FIG. 2). Similarly, such signal replication and phase-control can be implemented using the second signal source 52b and second common source signal 53b to produce phase-controlled signals 59b driving the antenna elements 49b of the second antenna sub-array 48b. As a result, the signals 47a, 47b, effectively having signal patterns along longitudinal axes with significantly different directivities can produce signals for reception by the DUT along preferred and non-preferred directions, resulting in received signal strengths higher and lower, respectively, than that received with a legacy (omnidirectional) signal. Following reception of these signals, the DUT 46 responds by adjusting its signal transmission characteristics so as to provide a responsive beamformed TX signal.

For example, the DUT 46 may start by transmitting a legacy TRQ signal, to which the first tester 50a responds with a legacy signal containing a sounding packet. The DUT 46 uses the sounding packet to estimate the CSI (of the effective signal path between the DUT 46 and first antenna sub-array 48a), which it then transmits back to the tester 50a for use in controlling the individual phases of the first set 59a of phase-controlled signals to produce a signal set 47a having an effective directivity (e.g., along direction A, as depicted in FIG. 2) for reception by the DUT 46. Such use of the CSI to produce the phase-controlled signals 45a results in constructive signal interference during reception by the DUT 46, thereby producing a higher received signal strength. In response, the DUT 46 may initially transmit a legacy signal followed by a beamformed signal along the same directivity axis with similar constructive signal interference (due to typically substantially similar signal path characteristics in the reverse direction) and having relative signal strengths as depicted in FIG. 3A, which are received via the first antenna sub-array 48a and measured by the first signal analysis subsystem 54a. Meanwhile, since the beamforming performed by the DUT is in favor of the effective signal path between the DUT 46 and first antenna sub-array 48a, this responsive signal from the DUT 46 will have relative signal strengths as depicted in FIG. 3B, which are received via the second antenna sub-array 48b and measured by the second signal analysis subsystem 54b. To further confirm proper beamforming operation by the DUT 46, this process can be repeated by exchanging legacy signals containing TRQ and sounding packets between the DUT 46 and second tester 50b with the favored direction now being the second effective signal path between the DUT 46 and second antenna sub-array 48b with relative received signal strengths as depicted in FIG. 3A, and the non-favored direction being the first effective signal path between the DUT 46 and first antenna sub-array 48a with relative received signal strengths as depicted in FIG. 3A. As a result, verification of proper beamforming operation on the part of the DUT 46 can be confirmed for a fully assembled DUT, including verification of proper operations of its multiple antennas and antenna connections.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:
1. A method for testing implicit beamforming operation of a radio frequency (RF) data packet signal transceiver device under test (DUT), comprising:
transmitting, within a multipath RF signal environment via a plurality of antennas, a plurality of phase-controlled RF signals for reception by a DUT disposed at a DUT position within said multipath RF signal environment, including
transmitting one or more of said plurality of phase-controlled RF signals as a multidirectional RF test signal,
transmitting, via a first portion of said plurality of antennas, a first portion of said plurality of phase-controlled RF signals as a first substantially unidirectional RF test signal with a longitudinal signal axis in a first forward direction substantially toward said DUT position, and
transmitting, via a second portion of said plurality of antennas, a second portion of said plurality of phase-controlled RF signals as a second substantially unidirectional RF test signal with a longitudinal signal axis in a second forward direction substantially toward said DUT position; and receiving, via said multipath RF signal environment and said plurality of antennas, a plurality of RF data packet signals transmitted by said DUT, including
receiving a multidirectional RF DUT signal,
receiving, via said first and second portions of said plurality of antennas, a first portion of said plurality of RF data packet signals as a first substantially unidirectional RF DUT signal with a longitudinal signal axis in a first reverse direction substantially toward said first portion of said plurality of antennas, and
receiving, via said first and second portions of said plurality of antennas, a second portion of said plurality of RF data packet signals as a second substantially unidirectional RF DUT signal with a longitudinal signal axis in a second reverse direction substantially toward said second portion of said plurality of antennas.

2. The method of claim 1, wherein:
said first forward and reverse directions are substantially parallel and define a first wireless signal path,
said second forward and reverse directions are substantially parallel and define a second wireless signal path, and
said first and second wireless signal paths are nonparallel.

3. The method of claim 1, wherein:
said receiving, via said first and second portions of said plurality of antennas, said first portion of said plurality of RF data packet signals as said first substantially unidirectional RF DUT signal with said longitudinal signal axis in said first reverse direction substantially toward said first portion of said plurality of antennas comprises receiving, via said first and second portions of said plurality of antennas, unequal first and second signal strengths, respectively; and
said receiving, via said first and second portions of said plurality of antennas, said second portion of said plurality of RF data packet signals as said second substantially unidirectional RF DUT signal with said longitudinal signal axis in said second reverse direction substantially toward said second portion of said plurality of antennas comprises receiving, via said first and second portions of said plurality of antennas, unequal third and fourth signal strengths, respectively.

4. The method of claim 3, wherein:
said first signal strength is greater than said second signal strength; and
said fourth signal strength is greater than said third signal strength.

5. The method of claim 1, wherein:
said multidirectional RF test signal comprises a nonbeamformed RF test signal;
said first substantially unidirectional RF test signal comprises a first beamformed RF test signal;
said second substantially unidirectional RF test signal comprises a second beamformed RF test signal;
said multidirectional RF DUT signal comprises a nonbeamformed RF DUT signal;
said first substantially unidirectional RF DUT signal comprises a first beamformed RF DUT signal; and
said second substantially unidirectional RF DUT signal comprises a second beamformed RF DUT signal.

6. The method of claim 1, wherein:
said multipath RF signal environment comprises an interior region of a structure; and
said structure defines said interior region and an exterior region, and is configured to substantially isolate said interior region from electromagnetic radiation originating from said exterior region.

7. A method for testing implicit beamforming operation of a radio frequency (RF) data packet signal transceiver device under test (DUT), comprising:
receiving, with a DUT disposed at a DUT position within a multipath RF signal environment from a plurality of antennas, a plurality of phase-controlled RF signals, including
receiving one or more of said plurality of phase-controlled RF signals as a multidirectional RF test signal,
receiving a first portion of said plurality of phase-controlled RF signals as a first substantially unidirectional RF test signal with a longitudinal signal axis in a first forward direction from a first portion of said plurality of antennas substantially toward said DUT position, and
receiving a second portion of said plurality of phase-controlled RF signals as a second substantially unidirectional RF test signal with a longitudinal signal axis in a second forward direction from a second portion of said plurality of antennas substantially toward said DUT position; and
transmitting, with said DUT via said multipath RF signal environment, a plurality of RF data packet signals, including
transmitting a multidirectional RF DUT signal,
transmitting a first portion of said plurality of RF data packet signals as a first substantially unidirectional RF DUT signal with a longitudinal signal axis in a first reverse direction substantially toward said first portion of said plurality of antennas, and
transmitting a second portion of said plurality of RF data packet signals as a second substantially unidirectional RF DUT signal with a longitudinal signal axis in a second reverse direction substantially toward said second portion of said plurality of antennas.

8. The method of claim 7, wherein:
said first forward and reverse directions are substantially parallel and define a first wireless signal path,
said second forward and reverse directions are substantially parallel and define a second wireless signal path, and
said first and second wireless signal paths are nonparallel.

9. The method of claim 7, wherein:
said transmitting said first portion of said plurality of RF data packet signals as said first substantially unidirectional RF DUT signal with said longitudinal signal axis in said first reverse direction substantially toward said first portion of said plurality of antennas comprises transmitting, to said first and second portions of said plurality of antennas, unequal first and second signal strengths, respectively; and
said transmitting said second portion of said plurality of RF data packet signals as said second substantially unidirectional RF DUT signal with said longitudinal signal axis in said second reverse direction substantially toward said second portion of said plurality of antennas comprises transmitting, to said first and second portions of said plurality of antennas, unequal third and fourth signal strengths, respectively.

10. The method of claim 9, wherein:

said first signal strength is greater than said second signal strength; and said fourth signal strength is greater than said third signal strength.

11. The method of claim 7, wherein:

said multidirectional RF test signal comprises a nonbeamformed RF test signal;

said first substantially unidirectional RF test signal comprises a first beamformed RF test signal;

said second substantially unidirectional RF test signal comprises a second beamformed RF test signal;

said multidirectional RF DUT signal comprises a non-beamformed RF DUT signal;

said first substantially unidirectional RF DUT signal comprises a first beamformed RF DUT signal; and said second substantially unidirectional RF DUT signal comprises a second beamformed RF DUT signal.

12. The method of claim 7, wherein:

said multipath RF signal environment comprises an interior region of a structure; and said structure defines said interior region and an exterior region, and is configured to substantially isolate said interior region from electromagnetic radiation originating from said exterior region.

\* \* \* \* \*